(12) United States Patent
Chen et al.

(10) Patent No.: US 6,490,279 B1
(45) Date of Patent: Dec. 3, 2002

(54) FAST DATA BASE RESEARCH AND LEARNING APPARATUS

(75) Inventors: Honglu Chen, Saratoga, CA (US); Ying Wang, Sunnyvale, CA (US); Tak-Lap Tsui, Sunnyvale, CA (US)

(73) Assignee: Advanced Communication Device, Inc., Fremont, CA (US)

( * ) Notice: Subject to any disclaimer, the term of this patent is extended or adjusted under 35 U.S.C. 154(b) by 0 days.

(21) Appl. No.: 09/121,586

(22) Filed: Jul. 23, 1998

(51) Int. Cl.[7] ............................................. H04L 12/56
(52) U.S. Cl. ..................... 370/392; 370/475; 711/216
(58) Field of Search .................... 370/356, 363, 370/364, 365, 368, 382, 389, 392, 397, 399, 400–404, 412, 413, 414, 415, 416, 417, 418, 419, 428, 429, 235–235.1, 475; 395/200–800; 709/230, 238; 707/6; 711/150, 157, 168, 169, 211, 216

(56) References Cited

U.S. PATENT DOCUMENTS

| | | | | |
|---|---|---|---|---|
| 5,414,704 A | * | 5/1995 | Spinney | 370/389 |
| 5,757,795 A | * | 5/1998 | Schnell | 370/392 |
| 5,864,554 A | * | 1/1999 | Rostoker et al. | 370/395 |
| 5,887,187 A | * | 3/1999 | Rostoker et al. | 712/29 |

* cited by examiner

Primary Examiner—Melvin Marcelo
Assistant Examiner—Inder Pal Mehra
(74) Attorney, Agent, or Firm—Bo-In Lin (57) ABSTRACT

This invention discloses an improved address table apparatus that includes an address bus for receiving input data packets and for hashing a designated bucket number and extracting a key from each of the data packets. The address table apparatus further includes a plurality of memory banks connected to the address bus wherein each memory bank includes a plurality of memory buckets for storing a designation address (DA) and a port number in each of the buckets. The address table apparatus further includes a comparand bus connected to the address bus for receiving the key therefrom. The address table apparatus further includes a plurality of comparators each corresponding to one of the memory banks for receiving the designation address (DA) and the port number from the designated bucket from a corresponding memory bank. The comparators further connected to the comparand bus for receiving and comparing the key to the address from the designated bucket in each of the memory banks. The address table apparatus further includes a result bus connected to the comparators for displaying an output port number from one of the comparators if the key extracted from one the data packets matching the designation address (DA) from one of the designated buckets.

15 Claims, 12 Drawing Sheets

FAST DATA BASE RESEARCH AND LEARNING APPARATUS

BACKGROUND OF THE INVENTION

1. Field of the Invention

This invention relates generally to the system architecture and data management techniques to configure and design a database searching and learning apparatus. More particularly, this invention relates to an improved database searching and learning system to speed up the database searching and learning processes for implementation in single chip Ethernet frame switching system. The database searching and learning processes can be completed within one or two clock cycles. Improved searching and learning process speed also enables a pipelined architecture for constructing systems to carry out database searching and learning processes.

2. Description of the Prior Art

As the Ethernet packet switch fabrics are now required to process gigabit per second, conventional technology is faced with a difficult challenge. The challenge is to perform an address resolution task at a rate of gigabits per second in order to be in synch with such a high data-rate in switching and transmission operation. Limited by the techniques available for address resolution, conventional methods are either too slow or too expensive. Practical application of Ethernet packet switch of higher data-rate is therefore hindered by this difficulty. In order to have better understanding of the technical background, the basic structure of the database entry items and the techniques employed for conducting an address resolution is explained first.

Figure 1:
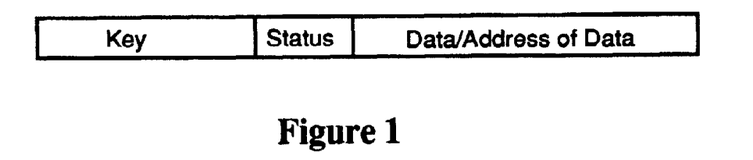
FIG. 1 is a data block structure showing the format of a database entry.

Database search logic is a technique applied to map the key of the searched item with the keys of all the items contained in a database. When a match is identified, the associated data in the database is retrieved as output. For a database employed for storing addresses for packet or cell switch, the database search logic is commonly referred to as lookup engine or address resolution logic. The database is generally referred to as an address table. FIG. 1 shows the structure of a database entry item, which typically comprises three parts. The first part is the key for identifying the item, e.g., an address. The second part is a status data for providing a state of this database entry item. The state of the item may be the data related to information such as validity, age and other control information. The third part is the data item itself. For an address table, the data item is the data associated with the address. For an Ethernet packet switching system, the data may be used as the value of a port number. Details for application of this data item in an Ethernet switching system will be further discussed below.

Figure 2:
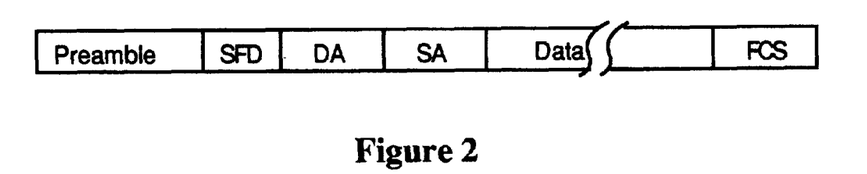
FIG. 2 is a data block structure showing the format of an Ethernet packet.

FIG. 2 shows the format of an Ethernet packet processed by an Ethernet switching system. The destination address (DA), is applied to identify the node to which the packet should be forwarded. The source address (SA) is included to indicate the address of the node from which the packed is sent out The lookup engine, i.e., an address resolution logic, for a switching fabric uses the DA as a key to find the destination port and the associated information related to the destination address if applicable. The source address (SA) is used by the automatic learning logic to establish the address table.

Figure 3:
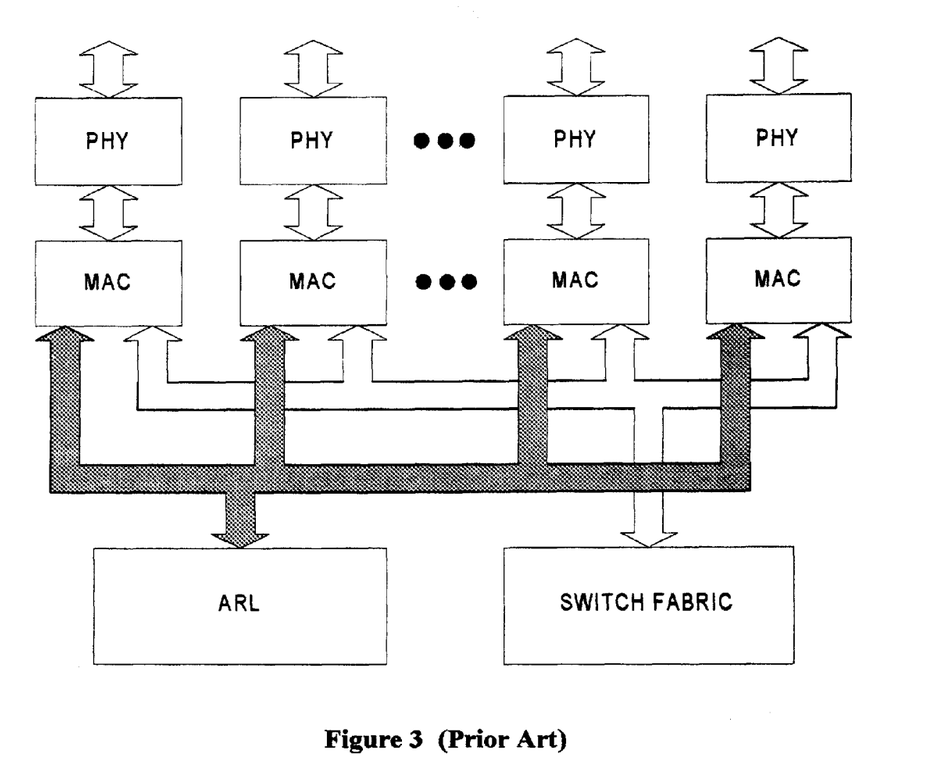
FIG. 3 is a functional block diagram for illustrating the system structure of an Ethernet packet switch system.

A typical Ethernet packet switch system is illustrated in FIG. 3. A data packet received from the media is converted into digital format by the physical layer device (PHY). A media access control (MAC) logic is responsible to retrieve the destination address (DA) data embedded in the packet and to pass the DA data as a key. The DA is used by the address resolution logic (ARL) as a key to search of the associated data item in the database. The database is an address table for this application. The ARL searches the address table to find the matched DA to retrieve a data item for providing an address of the destination port The destination port address is returned to the MAC. A request is then sent by the source MAC to the switch fabric to send the packet to the destination MAC. After receiving the packet, the destination MAC will forward the packet to the PHY for further transmission. For a gigabit Ethernet system, the rate for data transmission can be as high as $10^9$ bits per second. For an Ethernet packet switching system with one ARL shared by 16 MAC ports, there can be as high as 23.8-million address resolution requests per second. Under a worst-scenario assumption, the frequency of lookup request for address resolution can reach as high as the calculated value of:

$$16 * 10^9 \text{ bits}/ [(512+64+96) \text{ bits}] = 23.8 * 10^6$$

Where 512 bits is the minimum packet length with a 64-bit preamble and 96 inter-packet gap. As will be further discussed below, in order to satisfy such a high-speed processing requirement, very expensive ARL system has to be implemented when conventional techniques are applied.

Figure 4:
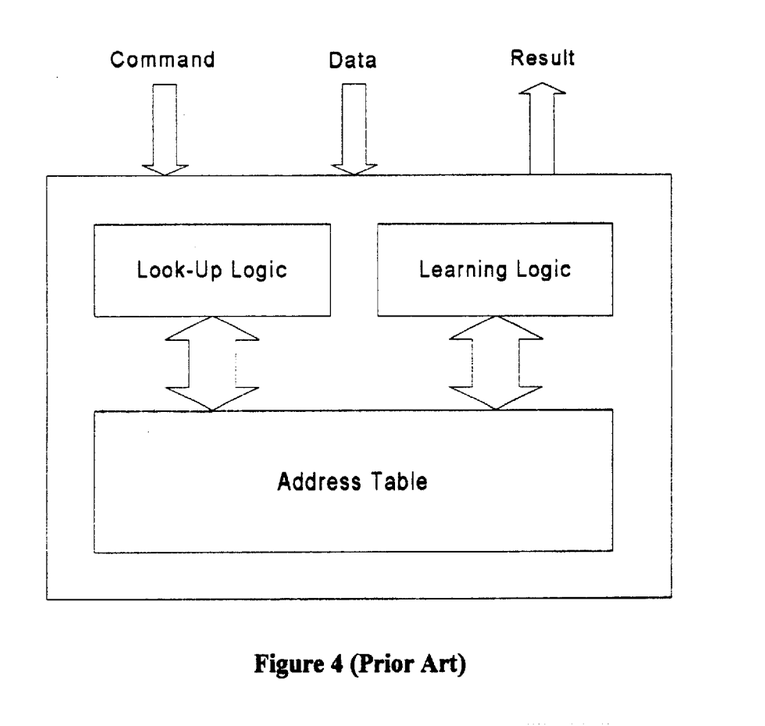
FIG. 4 is a functional block diagram showing the processing flow of an address resolution logic and associated address table for an Ethernet packet switch system.

FIG. 4 is a functional block diagram of a conventional address resolution logic system. There are two basic modules, i.e., a lookup logic module and a learning logic module, for an ARL system. Upon receiving a lookup request, a database search is performed to locate a database entry item matched the destination address contained in the received packet Conventional database search techniques such as link list search and content addressable memory (CAM) search are further discussed below.

Figure 5:
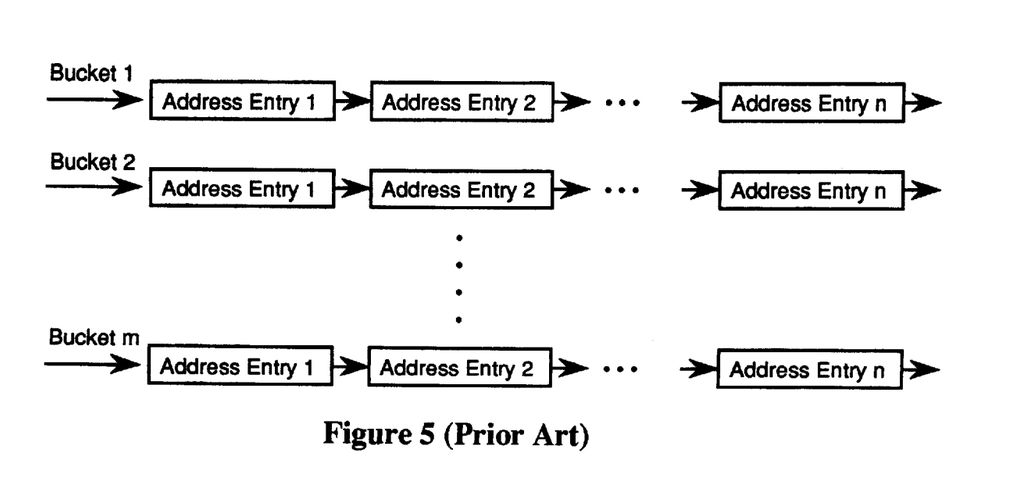
FIG. 5 is a block diagram showing the structure of a link-list based address table.
Figure 6:
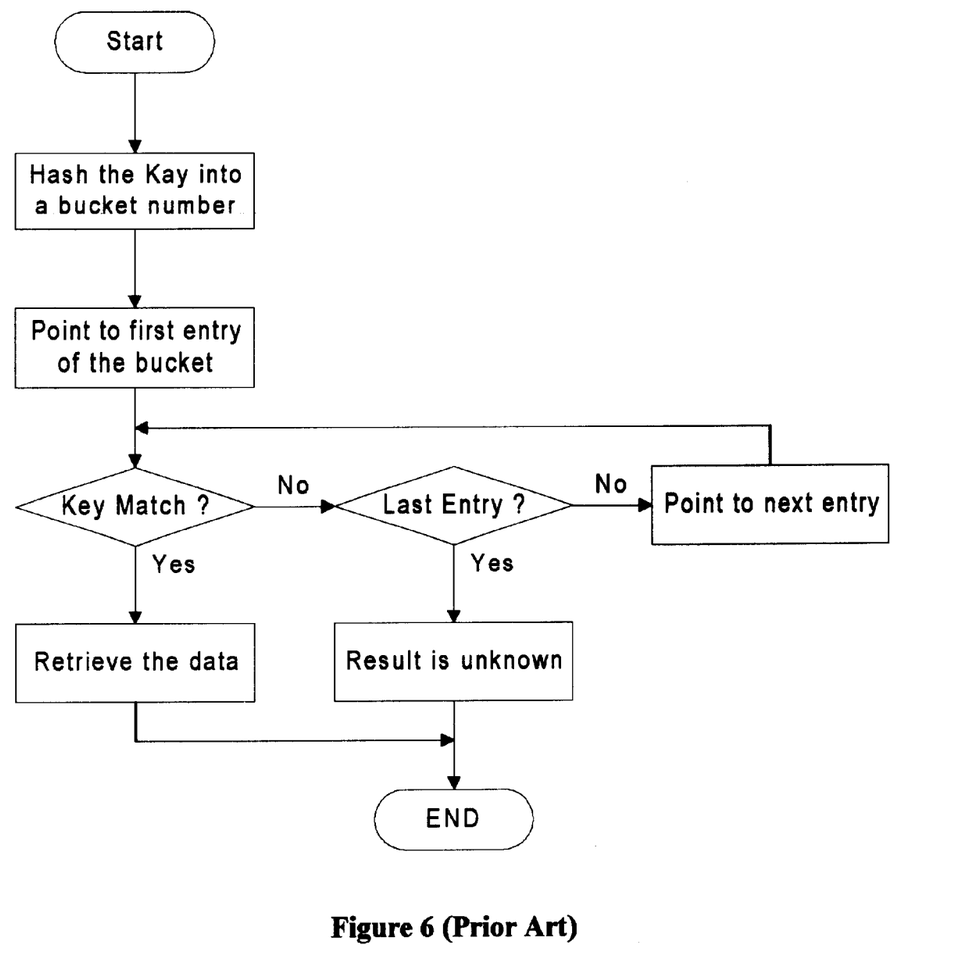
FIG. 6 is a flow chart showing the functional steps performed by a lookup logic on a link list based address table.
Figure 7:
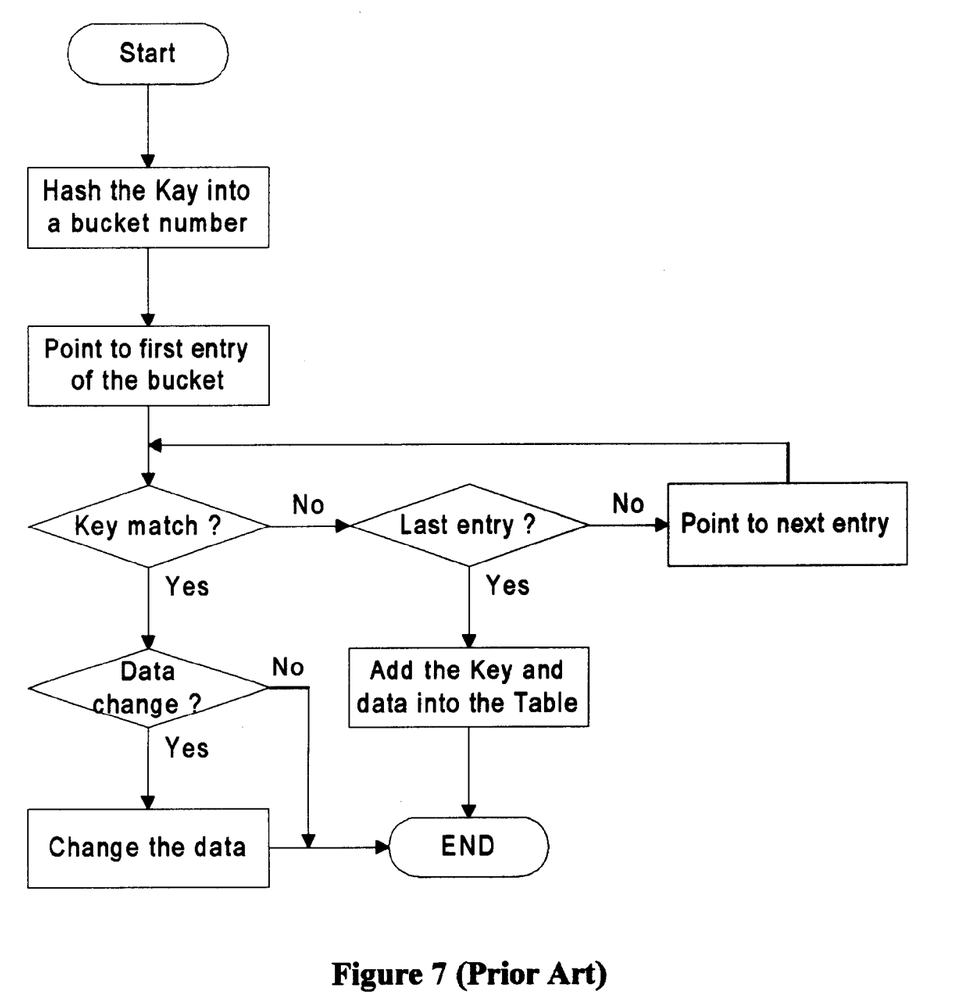
FIG. 7 is a flow chart showing the functional steps performed by a learning logic for a link list based address table.

The structure of a traditional address table is a link-list type table. The keys are hashed into different "buckets". In each bucket, entries of the data items are chained together through a link list The link lists can be sorted or unsorted lists. FIG. 5 shows the linking configurations of the data entries in each bucket for a link list based address table. FIG. 6 is a flow chart showing the processing steps of an ARL system in conducting a database search on a link-list based address table. After a lookup request is received, the key is first hashed into a bucket number. The search begins by pointing to the first entry of the bucket and then comparing the key with that of the first entry of the bucket. A check is made to find out if the key matches with the data in the first entry. If the key matches, then the data is retrieved, if not, another check is made to determine if this is the last entry in a specific bucket If not, then the process is pointed to a next entry in the bucket and another attempt is performed to match the key with the data. If this data entry is the last entry is the last entry in the bucket, then a "result unknown" is returned. In performing this search, for a sorted link list, a binary search algorithm can take up to $\log_2 N$ cycles where N is the length of the link list. For an unsorted link list, the search can take up N cycles. Similar to the lookup logic, the learning logic of the ARL system will also search if there is a match in the entry matched up with the key. As that shown in FIG. 7, the learning logic will also check if the data is changed when a matched key is identified. The data item in the database will be updated when there is a change in the data. If the key is not found in a bucket, the key and the data are added to the bucket in the learning process by the learning logic. Again, to update or insert a new database item, for a sorted link list, the learning process may take up log$_2$N cycles, and for an unsorted link list, it may take up N-cycles. Due to these time-cycle requirement, the link-list based methodology as discussed above is obviously too slow when a system is implemented with high transmission data rate.

Figure 8:
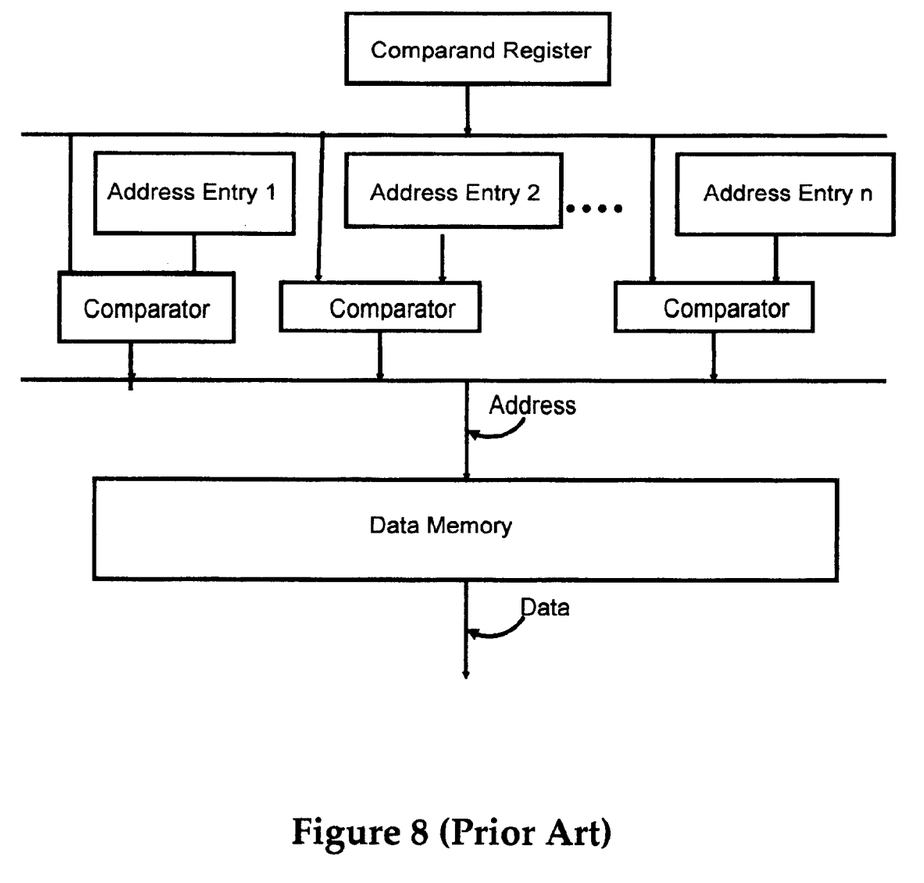
FIG. 8 is a functional block diagram showing the system structure of a content addressable memory based address table.
Figure 9:
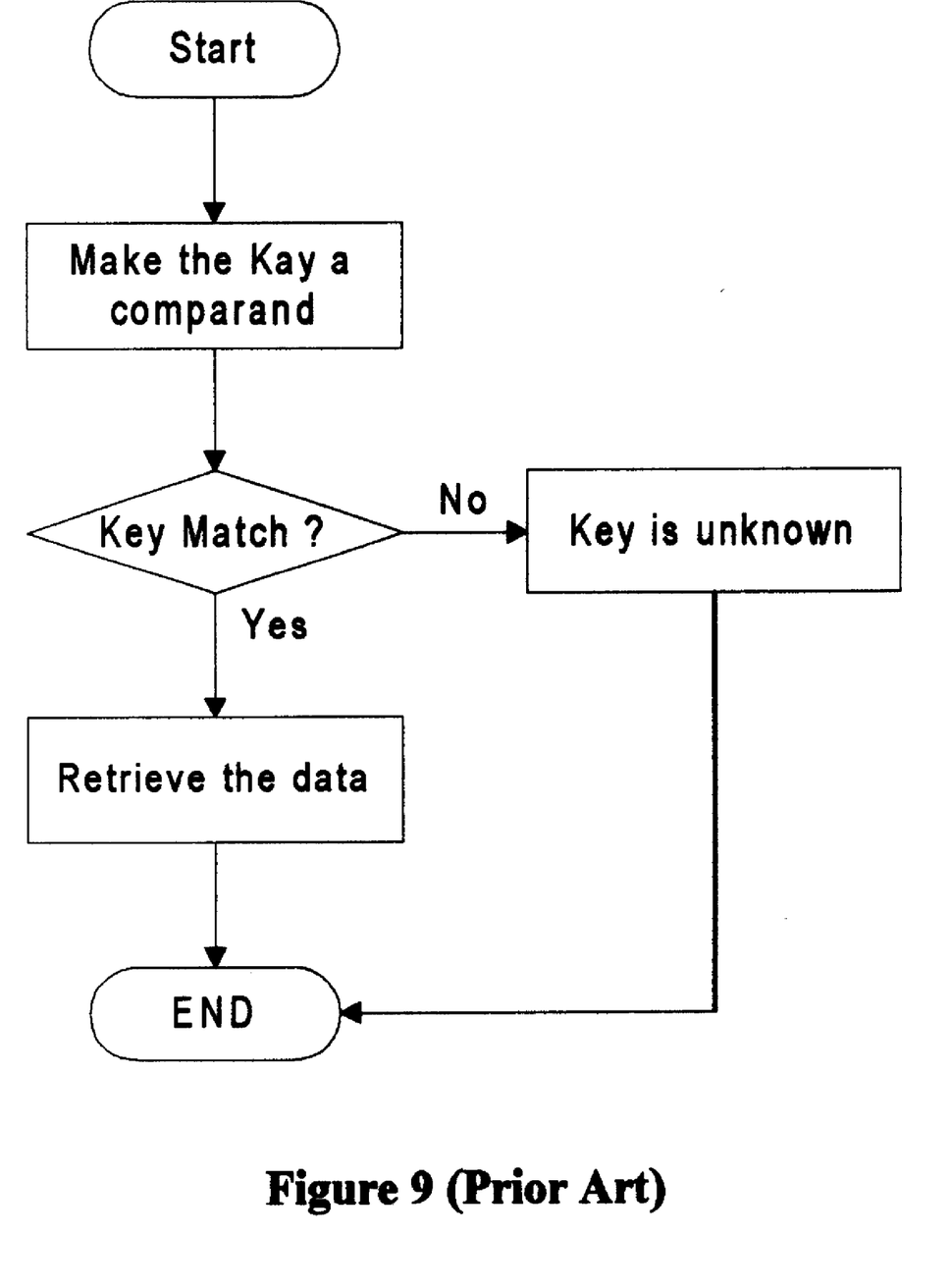
FIG. 9 is a flow chart showing the functional steps performed by a lookup logic for CAM based address table.
Figure 10:
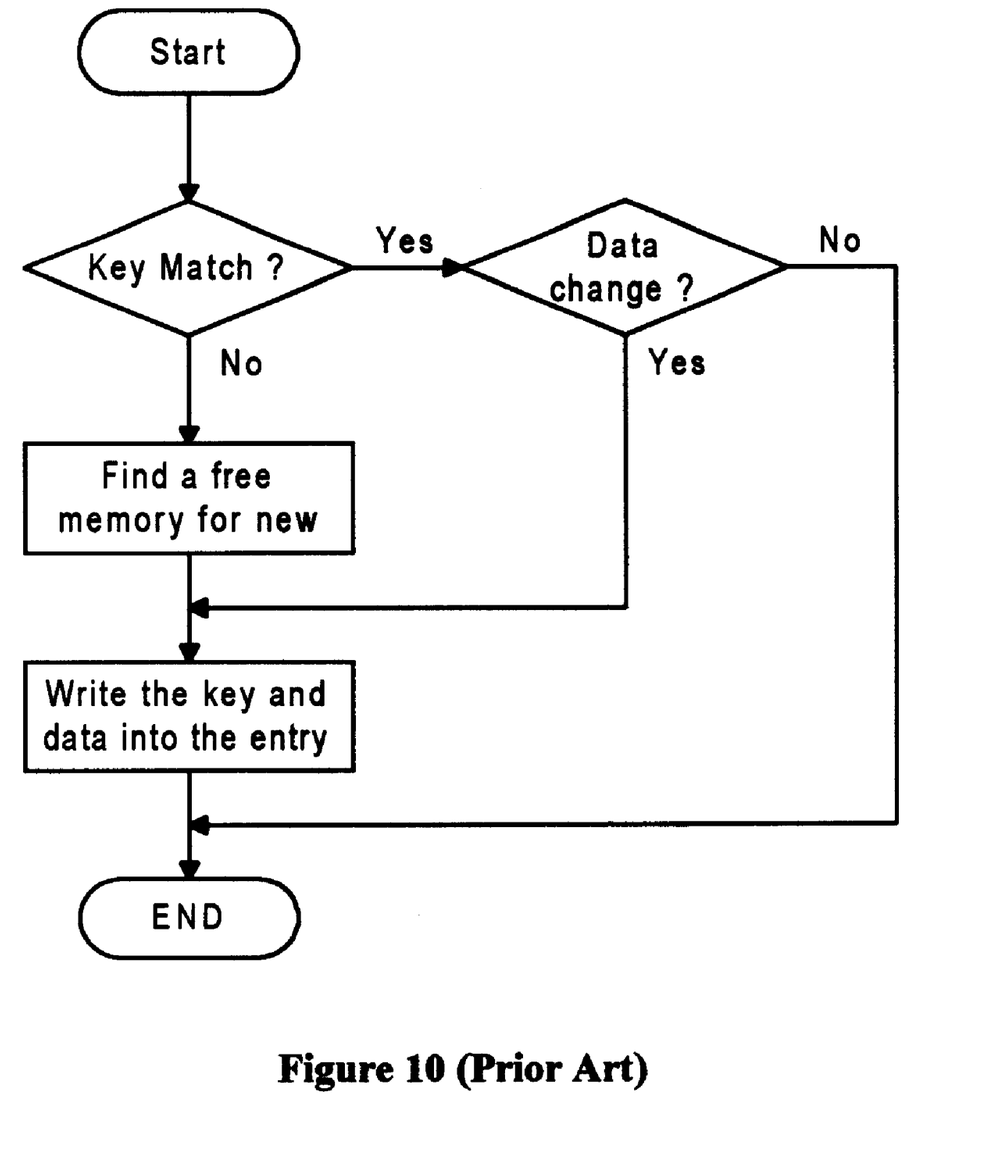
FIG. 10 is a flow chart showing the functional steps performed by a learning logic for CAM based address table.

Another conventional method for establishing and searching a database is by employing a content address memory (CAM) technique. FIG. 8 is an organizational configuration of a content addressable memory based address table. The CAM based ARL system includes a comparand register for receiving and temporarily storing the key. The ARL system further includes n-comparators. The data stored in the comparand register is compared to the address entry in each of these n-comparators. A matched address is identified and retrieved from the memory as the output data of the search process. The lookup process of a CAM-based address table is shown in FIG. 9 and the learning process is shown in FIG. 10. With the CAM address table configuration and processing method, the lookup process takes up only one cycle. However, each data entry of the address table must be provided with an individual comparator. Not only the address table is more expensive due to the comparator requirement, also, the amount of address data that can be stored in such address table is more limited due to the space taken up by these comparators. In contrast to the lookup process, the learning process of the CAM-based address table has to find an empty space to store a new entry, Therefore, in addition to the operations performed by the comparators, the learning logic may take extra cycles to find the appropriate location to store a new data entry. Therefore, with the CAM-based address table, there is still no guaranty that the lookup and the learning processes can be completed in a single cycle due to the uncertainty of completion of a learning process for continuously updating the database.

Therefore, a need still exists in the art of local area network communication to provide a new and improved system configuration and database management techniques for carrying out the lookup and learning logic operations for completing the frame switching tasks to match up with the higher data transmission rate. It is desirable that a system can be provided with assurance that the lookup and learning processes can be completed within one or two dock cycles. It is further desirable that such system can be implemented at a lower cost then the currently available CAM based addressable technology. A high-speed ARL operation can be provided that without incurring very expensive hardware configuration as that implemented in current CAM based systems.

SUMMARY OF THE PRESENT INVENTION

It is therefore an object of the present invention to provide an improved system configuration for performing completing the database searching and learning processes within one or two dock cycles such that the aforementioned difficulties and limitations in the prior art can be overcome.

Specifically, it is an object of the present invention to provide an improved system configuration and address table structure organized into a plurality of memory banks. Therefore, the database lookup and learning processes can be carried out by employing a plurality of comparators in parallel to compare the key with data items stored in specific bucket-slot from a plurality of memory banks. This two-dimensional memory slot array is therefore better organized for carrying out an instant access and key-identification. The difficulties encountered by conventional link-list or content based memory database can be overcome.

Another object of the present invention is to provide an improved system configuration and address table structure organized into a plurality of memory banks. The system configuration and address table organization is enabled to take advantage of the very wide data buses, which can be easily implemented inside a silicon chip. The improved database searching and learning system can therefore be conveniently implemented on a semiconductor chip.

Another object of the present invention is to provide an improved system configuration and address table structure organized into a plurality of memory banks. The database lookup and learning processes can be completed in a time-duration no more than two clock cycles. The improved system configuration and database organization can be suitable for cascading into pipeline configuration for high-speed lookup and learning processes.

Briefly, in a preferred embodiment, the present invention includes an address table apparatus that includes an address bus for receiving input data packets and for hashing a designated bucket number and extracting a key from each of the data packets. The address table apparatus further includes a plurality of memory banks connected to the address bus wherein each memory bank includes a plurality of memory buckets for storing a destination address (DA) and a port number in each of the buckets. The address table apparatus further includes a comparand bus connected to the address bus for receiving the key therefrom. The address table apparatus further includes a plurality of comparators each corresponding to one of the memory banks for receiving the destination address (DA) and the port number from the designated bucket from a corresponding memory bank. The comparators further connected to the comparand bus for receiving and comparing the key to the address from the designated bucket in each of the memory banks. The address table apparatus further includes a result bus connected to the comparators for displaying an output port number from one of the comparators if the key extracted from one the data packets matching the destination address (DA) from one of the designated buckets.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 11:
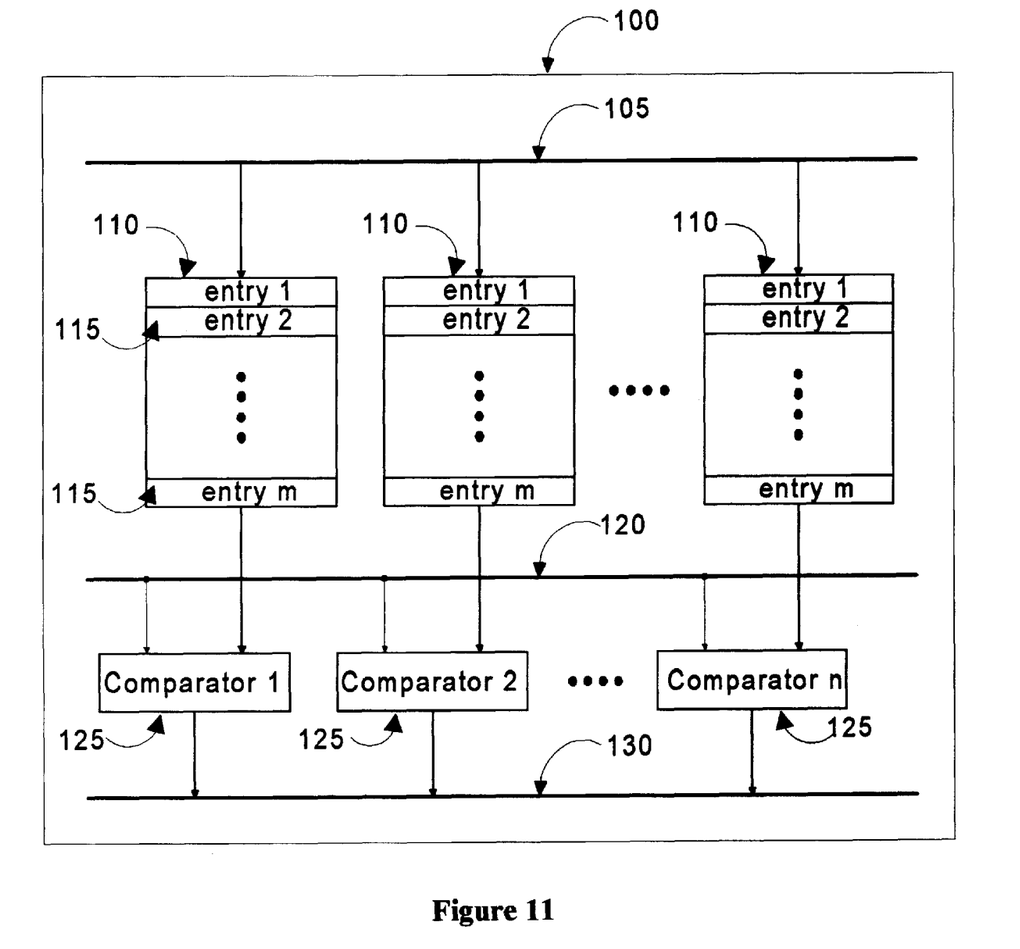
FIG. 11 is a functional block diagram showing the system configuration of a searching and learning system of this invention.

Please refer to FIG. 11 for a system configuration of a database searching and learning system 100 of the present invention. The address table of this system is divided into N memory blocks 110. Each memory block is employed to store M data item entries 115 where M and N are positive integers. For a lookup operation, the key is hashed into a bucket number K where K is an integer and $$1 < K < M \quad (1)$$

The $K^{th}$ entry of all memory block 110 become active and is made available for comparison. The key is displayed in the comparand bus 120 to be compared with the key stored in all active entries. At most one of the entries from $K^{th}$ entry in one of the N memory blocks can match up with the key. The data stored in the $K^{th}$ entry from one the memory blocks where a matched key is identified is produced from N comparators 125. The output from the N comparators 125 is transmitted via a result bus 130 to the MAC. In the case when none of the $K^{th}$ entry in all of the N memory blocks is matched up with the key, a default "unknown key" is provided as an output value.

According to FIG. 11 and the above description, this invention discloses an address table apparatus 100 that includes an address bus 105 for receiving input data packets and for hashing a designated bucket number and extracting a key from each of the data packets. The address table apparatus further includes a plurality of memory banks 110 connected to the address bus wherein each memory bank includes a plurality of memory buckets 115 for storing a destination address (DA) and a port number in each of the buckets. The address table apparatus 100 further includes a comparand bus 120 connected to the address bus 105 for receiving the key therefrom. The address table apparatus 100 further includes a plurality of comparators 125 each corresponding to one of the memory banks 110 for receiving the destination address (DA) and the port number from the designated bucket from a corresponding memory bank 110. The comparators 125 further connected to the comparand bus 120 for receiving and comparing the key to the address from the designated bucket in each of the memory banks. The address table apparatus 100 further includes a result bus 130 connected to the comparators 125 for displaying an output port number from one of the comparators 125 if the key extracted from one the data packets matching the destination address (DA) from one of the designated buckets 115.

Figure 12:
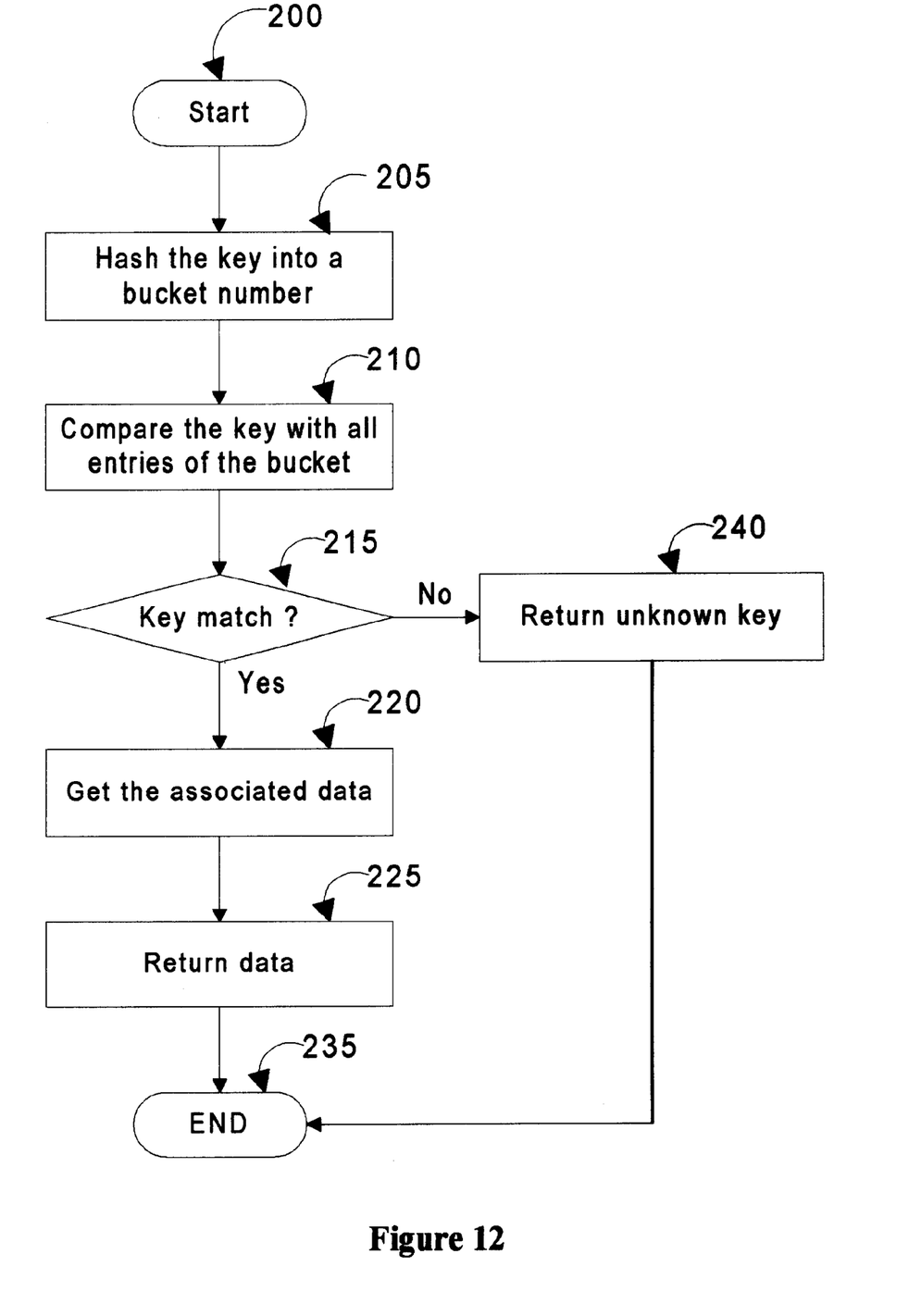
FIG. 12 is a flow chart showing the functional steps performed by a lookup logic based on an address table and a system configuration of FIG. 11 according to this invention.

The flowchart of FIG. 12 illustrates the processing steps of this database search system. To start the lookup process (step 200), the searching and learning system 100 hashes a key into a bucket number (step 205). The searching and learning system 100 then compares the key with all entries of the bucket retrieved from each memory bank 110 (step 210). A check is made to determine if the key matched with the data entry retrieved from the $K^{th}$ entry of each memory bank 110 (step 215). If the key does match the data entry, then the searching and learning system 100 also retrieve the associated data (step 220). The retrieved data is then returned as the output data (step 225). On the other hand, if the key does not match with any of the data retrieved from the $K^{th}$ entry of each memory bank 110, then an "unknown key" is returned (step 230). The lookup process is then ended (step 235). The lookup process can now be carried out in one clock cycle.

Figure 13:
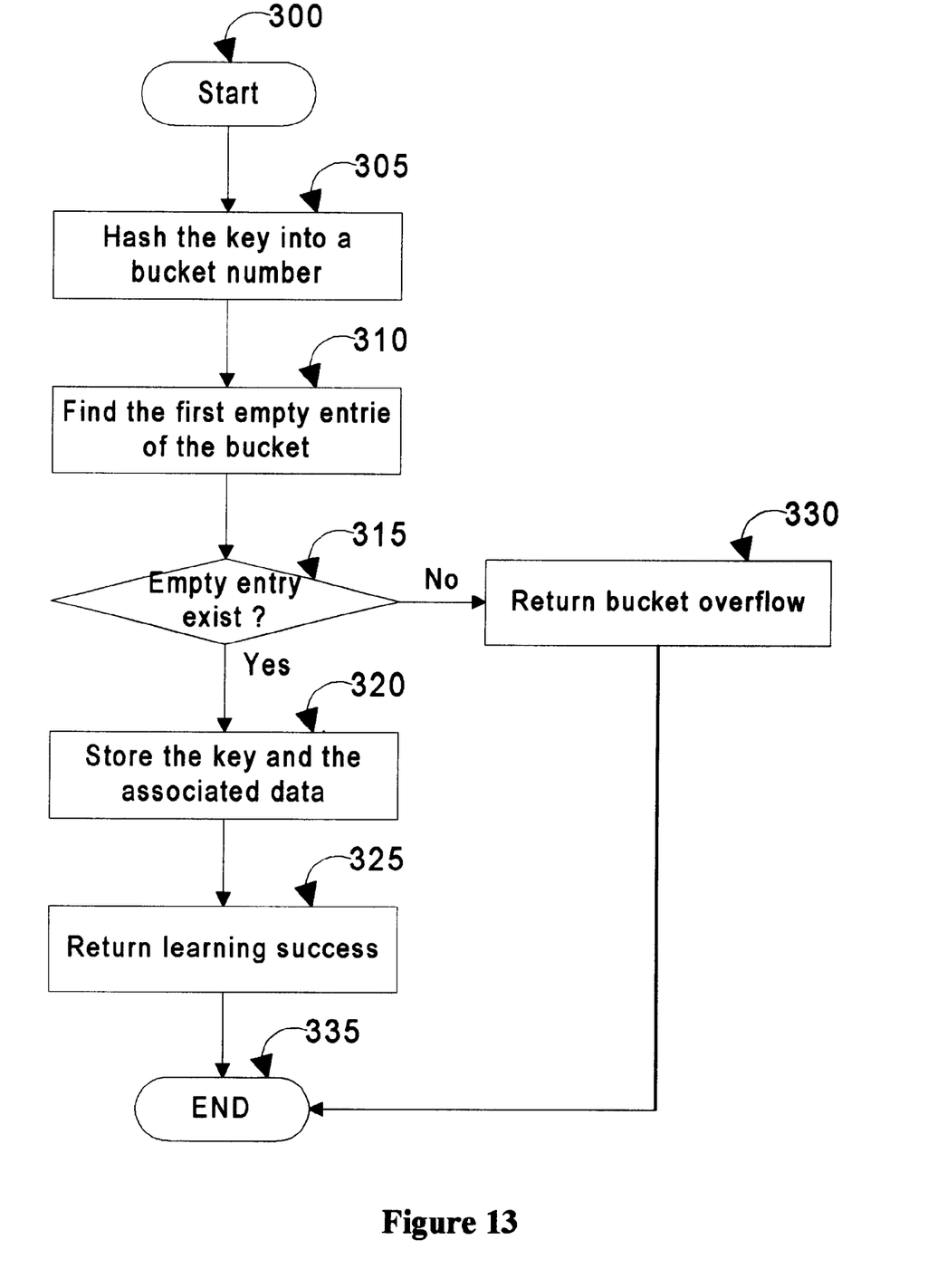
FIG. 13 is a flow chart showing the functional steps performed by a learning logic based on an address table and system configuration of FIG. 11 according to this invention.

FIG. 13 is a flow chart for illustrating the processing steps performed by the database searching and learning system 100 of this invention to carry out the learning process. After the start of the learning process (step 300), the searching and learning system 100 hashes the key into a bucket number (step 305), e.g., bucket number K where K is an integer between 1 and M (see equation 1). A search is performed to find out an empty entry in one of N memory banks (step 310). A check is performed to determine if there is an empty-entry is available (step 315). When it is determined that an empty entry is available in the $K^{th}$ entry of $J^{th}$ memory bank, the key and the associated data are stored in that empty slot A "learning success" message is returned as an output to the result bus (step 325). On the other hand, if an empty entry cannot be located in step 315, a "bucket overflow" message is returned (step 330) before the process of the learning logic is ended (step 335). The learning logic takes one cycle to compare and to find out if the key exists and if the data has been changed, and if there is an empty entry slot to store a new key into the address table. If a new key is required to be stored into the address table, the learning logic takes another cycle to write the key and the associated data into the address table. Therefore, the searching and learning system 100 is provided to complete the learning process in one cycle if no new information is to be written to the database. The searching and learning system 100 is provided to complete the learning process within two cycles when there is new data or changed data to be written into the database.

The structure as shown in FIG. 11 is particularly suitable for silicon chip implementation because the data bus can be made very wide, e.g., 1024 bit wide or even wider. The searching and learning processes can be expeditiously performed in parallel by employing a comparator in each memory bank. This architecture enables the completion of a searching operation in one cycle. For the purpose of writing back a data into the address table would take up another cycle. The overhead of managing the address table including learning of the new address, age control of each address entry item can be completed within one or two time cycles. Assuming each data entry for the database is 64 bits and the data bus of 1024 bit wide operating at a 66Mhz frequency, up to 66 million lookup requests and 33 millions learning requests can be supported by the searching and learning system 100 as that shown in FIG. 11. The system can be upgraded to support higher data rate either by employing a clock of higher frequency or employing a wider data bus.

Figure 14:
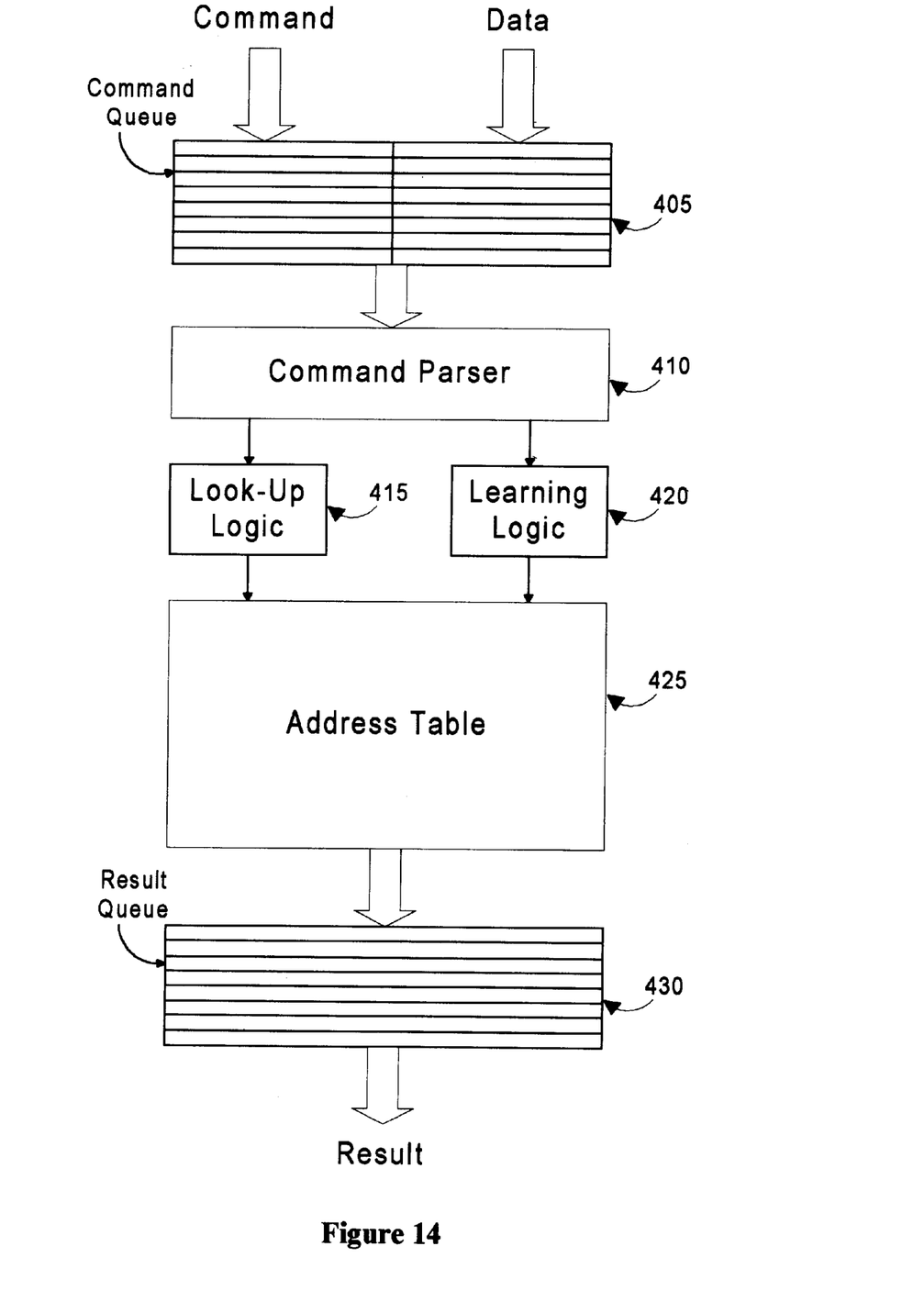
FIG. 14 is a block diagram showing an address lookup system based on a system configuration of FIG. 11 according to this invention.

FIG. 14 is another preferred embodiment of address lookup system 400 by applying the searching and learning system configuration similar to that disclosed in FIG. 11. The address lookup system includes a command queue 405 to receive and temporarily store the command and data associated with each command. The command and the associate data stored in the command queue 405 are then passed to and processed by a command parser 410 to generate either a lookup request or a learning request A lookup request is transferred to a lookup logic 415 and a learning request is transferred to a learning logic 420. For a lookup request, the data associated with the command is a key to be matched. For a learning request, the data includes the key and the associated data such as the port numbers or other types of parameters. The lookup logic or the learning logic performs the processing steps as described above by employing a searching and learning system as that shown in FIG. 11. The lookup logic 415 or the learning logic 420 either retrieve a data item from or writing a data into the address table respectively during an access to the address table. The results of the lookup logic or the learning logic are then temporarily stored in the result queue 430. The results are then passed on to a result bus for transfer to an output device to be further processed.

Figure 15:
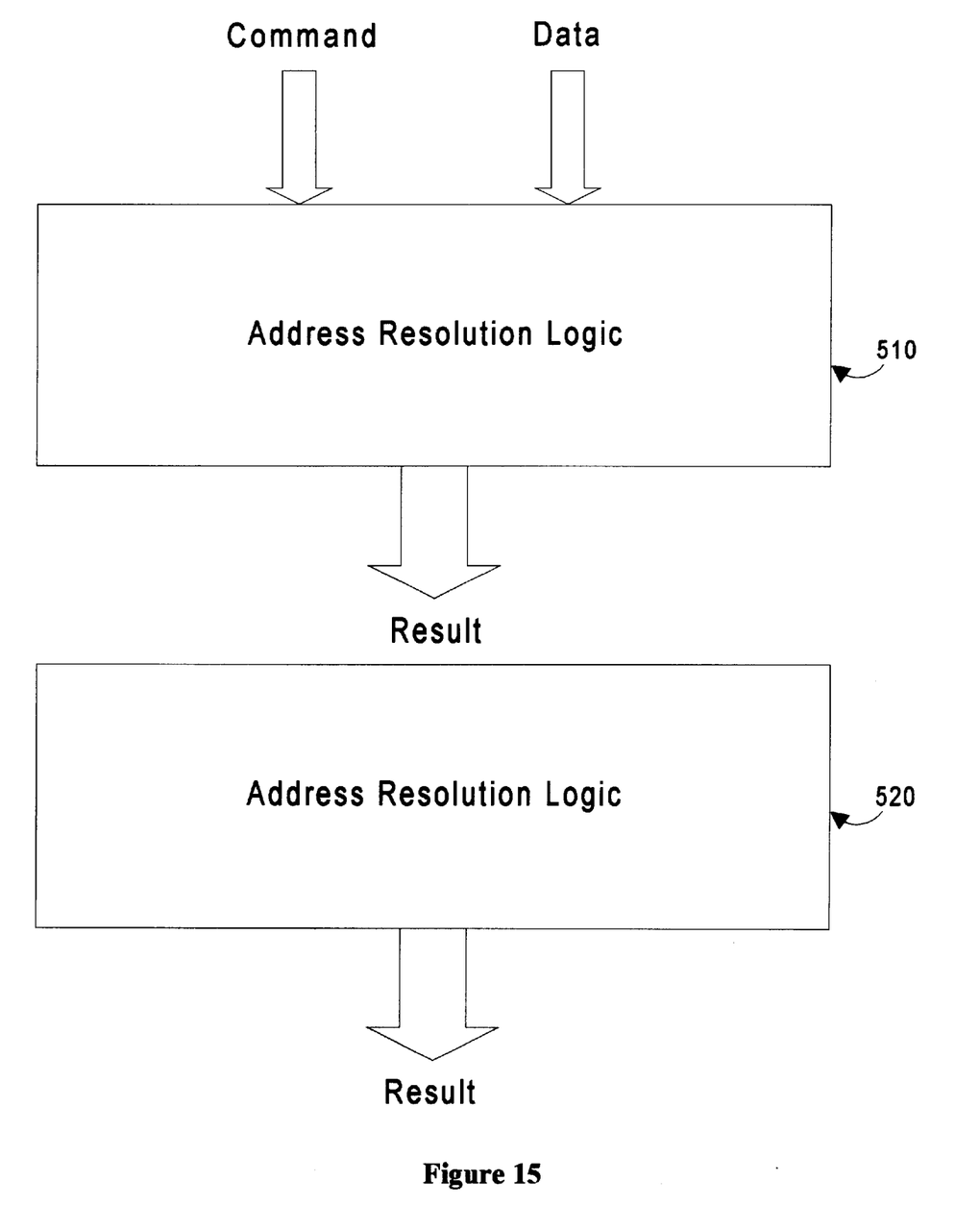
FIG. 15 is a block diagram showing a cascaded address resolution logic employed to perform pipelined operations implemented with the searching and learning system of FIG. 11 according to the present invention.

Since the lookup or the learning process can be completed within either a one or two dock cycles, the searching and learning system 100 is very suitable for pipelined operation. FIG. 15 is a diagram showing the address resolution logic modules, 510 and 520, which are cascaded. The result form a previous module 510 may become a command for a next pipelined module 520 for pipelined processes. The pipelined processes can be implemented in a switch system, which supports the layer-3 routing switch operations. The first module in the pipelined system, an attempt to match a layer-2 address is first performed. If the layer-2 address match is not successful, the process is passed on to a next-pipelined module to perform the layer-3 process. More efficient use of resources and higher switching speed is achieved by employing a routing and switching system with a pipelined architecture.

Therefore, an improved system configuration for performing completing the database searching and learning processes within one or two clock cycles is provided. The difficulties and limitations in the prior art are overcome. Specifically, the present invention provides an improved system configuration and address table structure organized into a plurality of memory banks. Therefore, the database lookup and learning processes can be carried out by employing a plurality of comparators in parallel to compare the key with data items stored in specific bucket-slot from a plurality of memory banks. This two-dimensional memory slot array is therefore better organized for carrying out an instant access and key-identification. The difficulties encountered by conventional link-list or content based memory database are thus resolved. The system configuration and the address table organization thus enable a system designer to take advantage of the very wide data buses. The wide data bus can be easily implemented on a silicon chip. The improved database searching and learning system can therefore be conveniently implemented on a semiconductor chip. With the improved system configuration and address table structure organized into a plurality of memory banks, the database lookup and learning processes can be completed in a time-duration no more than two clock cycles. The improved system configuration and database organization can be suitable for cascading into pipeline configuration for high-speed lookup and learning processes.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An address table apparatus comprising:
   an address bus for receiving input data packets and for hashing a designated bucket number and extracting a key from each of said data packets;
   a plurality of memory banks connected directly to said address bus wherein each memory bank includes a plurality of memory buckets for storing a destination address (DA) and a port number for each of said packets in each of said buckets having a bucket number corresponding to a bucket number hashed from said each of said data packets;
   a comparand bus connected to said address bus for receiving said key therefrom;
   a plurality of comparators each corresponding to one of said memory banks for directly connected to and receiving said destination address (DA) and said port number from said designated bucket from a corresponding memory bank, said comparators further connected directly to said comparand bus for receiving and comparing said key to said address from said designated bucket in each of said memory banks; and
   a result bus connected directly to said comparators for displaying an output port number from one of said comparators if said key extracted from one said data packets matching said destination address (DA) from one of said designated buckets.

2. The address table apparatus of claim 1 wherein:
   said address bus, said comparand bus, said result bus, and said memory banks are disposed on a semiconductor chip.

3. The address table apparatus of claim 2 wherein:
   said address bus and said comparand bus having a bus-width equal to or more than 1024 bits.

4. The address table apparatus of claim 1 further comprising:
   a command queue for receiving and temporarily storing a plurality of lookup/learning commands therein; and
   a command parser for processing said lookup/learning commands for generating said data packets for inputting to said data bus.

5. The address table apparatus of claim 4 further comprising:
   a result queue for receiving and temporarily storing said port number from said result bus.

6. A method for performing a lookup operation over an address table comprising:
   (a) receiving input data packets from an input address bus for hashing a designated bucket number and extracting a key from each of said data packets;
   (b) reading a destination address (DA) and a port number from a memory bucket corresponding to said designated bucket number from each of a plurality of memory banks each having a plurality of said memory buckets for storing a destination address (DA) and a port number in each of said memory buckets;
   (c) employing a plurality of comparators for receiving said destination address (DA) and said port number and for comparing said key to said address from said designated bucket in each of said memory banks; and (d) displaying an output port number from one of said comparators if said key extracted from one said data packets matching said destination address (DA) from one of said buckets corresponding to said designated bucket number.

7. The method for performing a lookup operation over an address table of claim 6 further comprising:

(e) displaying an unknown key if said key extracted from one said data packets does not match any of said destination addresses (DA) from all of said buckets corresponding to said designated bucket number.

8. A method for performing a learning operation over an address table comprising:

(a) receiving an input data packet from an input address bus for hashing a key into a designated bucket number;

(b) finding an empty memory bucket among a plurality of memory buckets corresponding to said designated bucket number from a plurality of memory banks wherein each of said memory banks configured for having a plurality of memory buckets; and (c) storing said key and said data packet in said empty memory bucket found in one of said memory banks and returning a learning success message if an empty memory bucket is found and returning a bucket overflow message if no empty memory bucket is found in said step (b).

9. The method for performing a learning operation over an address table of claim 8 further comprising:

(d) returning a bucket overflow message when none of the memory buckets corresponding to said designated bucket number from said plurality of memory banks is empty.

10. The method for performing a learning operation over an address table of claim 8 wherein:

said step (c) of storing data of said data packet in said empty memory bucket is a step of storing a destination address and port number in said empty memory bucket.

11. An address table apparatus comprising:

a command queue for receiving and temporarily storing a plurality of lookup/learning commands therein;

a command parser for receiving from said command queue and for processing said lookup/learning commands for generating a lookup command or a learning command;

a lookup logic for receiving and processing said lookup command for generating a designated bucket number and a lookup key number;

an address table having a plurality of memory banks connected to said lookup logic wherein each of said memory banks includes a plurality of memory buckets for storing a lookup address and a lookup output data in each of said buckets;

a comparand bus connected directly to said lookup logic for receiving said lookup key therefrom;

a plurality of comparators each corresponding to one of said memory banks for receiving said lookup address and said lookup data from a memory corresponding to said designated bucket number of a corresponding memory bank, said comparators further connected to said comparand bus for receiving and comparing said lookup key to said lookup address from each of said memory buckets corresponding to said designated bucket number; and a result queue connected to said comparators for receiving and temporary storing a lookup output data from one of said comparators if said lookup key matching said lookup address from one of said memory buckets.

12. The address table apparatus of claim 11 further comprising:

a learning logic for receiving and processing said learning command for generating a designated bucket number and a memory-bucket storage data;

said learning logic further having an empty memory bucket means for searching an empty memory bucket from a plurality of memory buckets corresponding to said designated bucket number in each of said memory banks; and said learning logic further having a data-storing means for determining an empty memory bucket is found and for storing said memory-bucket storage data into said empty memory bucket.

13. The address table apparatus of claim 12 wherein:

said command queue, said command parser, said lookup logic, said learning logic, said comparand bus, said result queue, and said address table are disposed on a semiconductor chip.

14. The address table apparatus of claim 13 further comprising:

an address bus for passing said lookup command and said learning command to said address table; and said address bus and said comparand bus having a bus-width equal to or more than 1024 bits.

15. The address table apparatus of claim 11 further comprising:

a cascaded address table apparatus provided for receiving a command from said address table apparatus for pipelined operation.

* * * * *